INVENTORS
Edmond D. Neuberger &
Hubert M. Rivers

United States Patent Office 3,527,571
Patented Sept. 8, 1970

3,527,571
CONDUCTIVITY SYSTEMS
Edmond D. Neuberger, Mount Lebanon Township, Allegheny County, and Hubert M. Rivers, Upper Saint Clair Township, Allegheny County, Pa., assignors to Calgon Corporation, a corporation of Delaware
Filed July 23, 1968, Ser. No. 746,794
Int. Cl. B01k 3/00
U.S. Cl. 23—253       8 Claims

ABSTRACT OF THE DISCLOSURE

A conductivity system having a main cell chamber and a by-pass connected at top and bottom, an inlet to the chamber, a pair of spaced outlets and an overflow and a fluid neutralizing agent inlet into the by-pass whereby a sample in the chamber may be neutralized.

---

This invention relates to conductivity systems and particularly to a cell for measuring neutralized conductivity.

Conductivity cells are not new in and of themselves. Some cells have an inlet and an outlet and a pair of electrodes for measuring the conductivity of a liquid in the cell. Such cells are generally useful for making a conductivity measurement on a sample as fed to it. Where it is desired to obtain an original conductivity value for a liquid and a neutralized conductivity value for the same liquid in order to obtain a differential conductivity value for the liquid it is necessary to first make the original conductivity measurement in a conductivity cell, then remove the liquid to a neutralizing chamber where a neutralizing agent is added and then either return the neutralized liquid to the original conductivity cell or to a second conductivity cell for a measurement of neutralized conductivity. This sequence of operations is time consuming and requires excessively complicated equipment.

We have invented a conductivity system in which the original conductivity can be measured, the sample neutralized and the neutralized conductivity measured all in the same system. This eliminates the need for a neutralizing chamber and for means for transferring the sample, and significantly reduces the time and expense of such determinations.

We preferably provide a conductivity system including a cell having a plurality of electrodes passing through the sidewall, a normally closed sample inlet into said system, a pair of spaced normally closed outlets on said system, a normally open overflow on said system, a by-pass communicating with said system at spaced points between the normally closed spaced outlets, and a normally closed neutralizing agent inlet in said by-pass for selectively introducing neutralizing agent into said by-pass. Preferably the conductivity system is a vertically elongated chamber having a normally closed sample inlet adjacent the bottom, a normally closed outlet below the sample inlet, a second normally closed outlet at the top of the chamber, a normally open overflow above the second outlet, a by-pass line communicating from the bottom to the top of said chamber between the two outlets and a neutralizing agent inlet communicating with said by-pass line. Preferably the neutralizing agent inlet is connected to a gaseous source of neutralizing agent.

Figure 2:
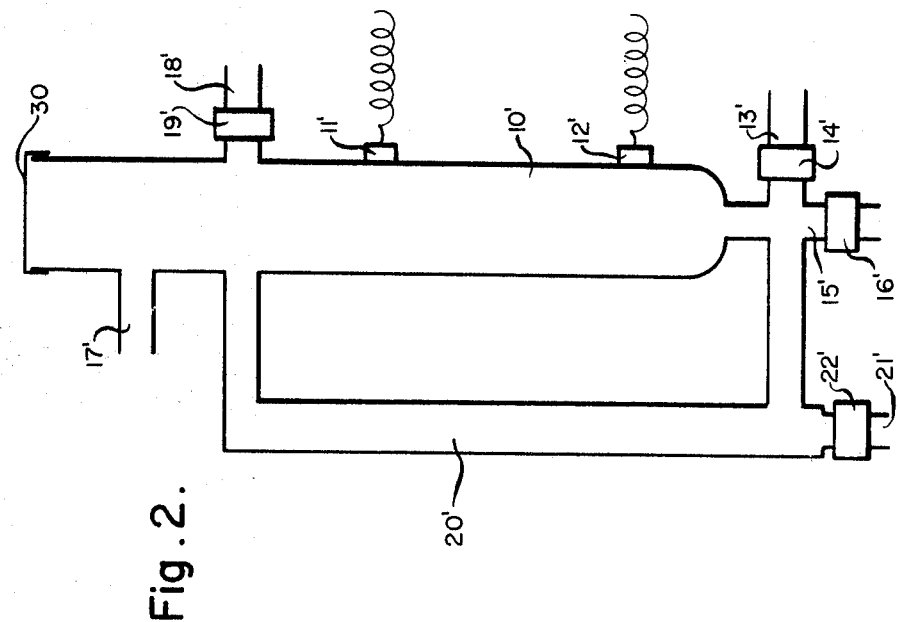
Figure 1:
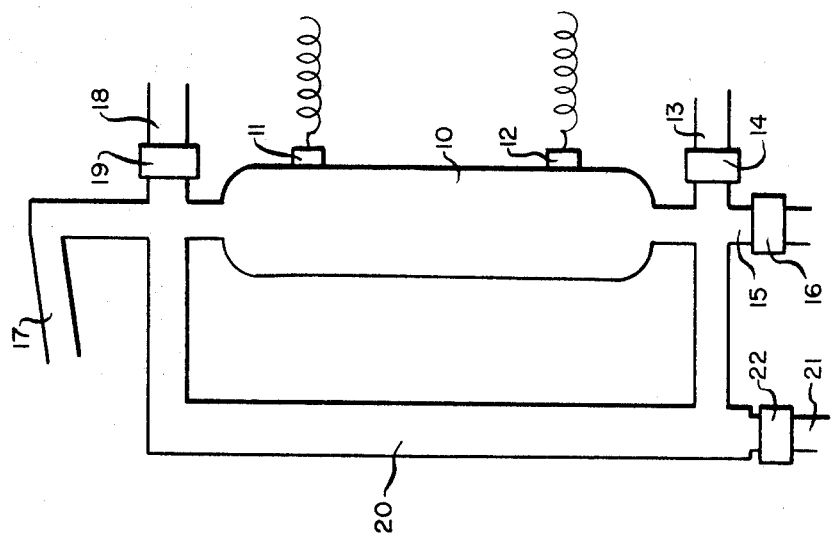

In the foregoing general description we have set out certain objects, advantages and purposes of our invention. Other objects, advantages and purposes of the invention will be apparent from a consideration of the following description and the accompanying drawings in which:

FIG. 1 is a side elevational view of a preferred form of conductivity system according to our invention; and FIG. 2 is a side elevational view of a second form of conductivity system according to our invention.

Referring to the drawings we have illustrated a cell 10 having electrodes 11 and 12 spaced apart along its length. An inlet 13 having a normally closed valve 14 is provided at the base of the cell above an outlet line 15 having a normally closed valve 16. An open overflow line 17 is spaced above the top of the cell 10 and above an upper outlet line 18 having a normally closed valve 19 so as to form an expansion area above outlet 18. A parallel by-pass line 20 is connected to the top and bottom of the cell 10 between the two outlet lines 15 and 18. A neutralizing agent line 21 having a normally closed valve 22 is provided at by-pass line 20.

The system of FIG. 1 operates as follows: Sample is introduced into cell 10 from line 13 through valve 14 until it overflows through overflow 17. This fills both cell 10 and by-pass 20. Valve 19 is then opened and the portion of sample between outlet 18 and overflow 17 is removed to provide a constant head. The original conductivity as measured between electrodes 11 and 12 is recorded. Neutralizing agent, in the form of a fluid such as $CO_2$ for alkaline sample or $NH_3$ or an amine solution for acid samples is introduced through line 21 and valve 22 into the by-pass. The fluid neutralizing agent flows up the by-pass 20 and causes circulation of the sample in the cell system. As the neutralizing process proceeds, more fluid agent passes up the by-pass and finally escapes over the overflow. Upon completion of neutralization, valve 22 is closed, the conductivity of the neutralized sample measured between electrodes 11 and 12 and the sample is discharged by opening valve 16 in line 15. The cell is purged for the next sample by passing sample solution through it and over the discharge.

The neutralizing agent is preferably in the form of a gas under pressure or a liquid under pressure.

The system shown in FIG. 2 is substantially the same as that of FIG. 1 and like parts carry like identifying numerals. The difference is in the fact that the cell is carried past the overflow 17' and the upper outlet 18' and is open at the top but provided with a removable cover 30. Its operation is identical with that of FIG. 1.

In the foregoing specification, we have set out certain preferred embodiments of our invention, it will be understood, however, that this invention may be otherwise embodied within the scope of the following claims.

We claim:

1. A conductivity system comprising a main conductivity cell having a plurality of spaced electrodes extending into the interior thereof, a normally closed sample inlet communicating with said cell, a pair of spaced normally closed outlets communicating with said cell, a normally open overflow above and communicating with said cell, a by-pass communicating with said cell at spaced points between the spaced normally closed outlets, and a normally closed neutralizing agent inlet communicating with said by-pass.

2. A conductivity system as claimed in claim 1 wherein the main cell is a vertically elongated chamber and the normally closed outlets connect thereto adjacent the top and bottom of said chamber.

3. A conductivity system as claimed in claim 1 wherein the neutralizing agent inlet is connected to a source of gaseous neutralizing agent under pressure.

4. A conductivity system as claimed in claim 2 wherein the by-pass connects to the chamber adjacent the top and bottom between the outlet connections.

5. A conductivity system as claimed in claim 1 wherein the overflow is spaced vertically above the uppermost of the outlets to form an expansion chamber therebetween.

6. A conductivity system as claimed in claim 1 wherein the cell is connected to a source of gaseous mixing agent.

7. A conductivity system as claimed in claim 6 wherein the cell is connected to a source of gaseous mixing and gas neutralizing agent.

8. A conductivity system as claimed in claim 1 wherein the neutralizing agent inlet is connected to a source of liquid neutralizing agent.

References Cited

UNITED STATES PATENTS 3,314,864  4/1967  Hersch _____ 204—195

MORRIS O. WOLK, Primary Examiner

R. M. REESE, Assistant Examiner

U.S. Cl. X.R.

204—195, 277; 324—30